(12) United States Patent
Miller et al.

(10) Patent No.: US 9,640,089 B2
(45) Date of Patent: May 2, 2017

(54) METHOD AND APPARATUS FOR MULTIPLE MEDICAL SIMULATOR INTEGRATION

(75) Inventors: Charles G. Miller, Allison Park, PA (US); Clifford D Olmstead, Allison Park, PA (US)

(73) Assignee: KbPort LLC, Allison Park, PA (US)

( * ) Notice: Subject to any disclaimer, the term of this patent is extended or adjusted under 35 U.S.C. 154(b) by 1507 days.

(21) Appl. No.: 12/883,134

(22) Filed: Sep. 15, 2010

(65) Prior Publication Data

US 2011/0223573 A1 Sep. 15, 2011

Related U.S. Application Data

(60) Provisional application No. 61/242,482, filed on Sep. 15, 2009.

(51) Int. Cl.
*G09B 23/28* (2006.01)
*G09B 23/30* (2006.01)

(52) U.S. Cl.
CPC ............. *G09B 23/28* (2013.01); *G09B 23/30* (2013.01)

(58) Field of Classification Search
CPC ................................ G09B 23/28; G09B 23/30
USPC .................................................. 434/262, 267
See application file for complete search history.

(56) References Cited

U.S. PATENT DOCUMENTS

| 7,648,365 | B2* | 1/2010 | Olsen .......................... 434/219 |
| 8,113,844 | B2* | 2/2012 | Huang et al. ................. 434/262 |
| 8,190,080 | B2* | 5/2012 | Huang ......................... 434/350 |
| 8,251,703 | B2* | 8/2012 | Zamierowski et al. ...... 434/262 |
| 2006/0212085 | A1* | 9/2006 | Fischell et al. ................. 607/32 |
| 2006/0286524 | A1* | 12/2006 | Boyers et al. ............... 434/262 |
| 2006/0292536 | A1* | 12/2006 | Hoster, Jr. ................... 434/262 |
| 2008/0124694 | A1* | 5/2008 | Miller et al. ................. 434/262 |
| 2008/0138780 | A1* | 6/2008 | Eggert et al. ................ 434/266 |
| 2009/0191529 | A1* | 7/2009 | Mozingo et al. ............ 434/262 |
| 2010/0227303 | A1* | 9/2010 | Deering ....................... 434/273 |

* cited by examiner

*Primary Examiner* — Peter Egloff
(74) *Attorney, Agent, or Firm* — Buchanan Ingersoll & Rooney PC

(57) ABSTRACT

A method and apparatus for multiple medical simulator integration provides multiple medical simulators and simultaneously receives at least one electronic data source input from each medical simulator into a common digital memory buffer in a time stamped manner for at least a given training event. Each electronic data source input is a data record throughout the event of a simulated parameter of the training simulator or a physical parameter of the training simulator. The common memory buffer allows independent, simultaneous, synchronized, user controlled playback of the individual inputs received within the memory buffer in any number of user defined configurations.

17 Claims, 3 Drawing Sheets

METHOD AND APPARATUS FOR MULTIPLE MEDICAL SIMULATOR INTEGRATION

CROSS REFERENCE TO RELATED APPLICATIONS

The present application claims the benefit of U.S. Provisional Patent Application Ser. No. 61/242,482, entitled "Method and Apparatus for Multiple Medical Simulator Integration" filed Sep. 15, 2009.

BACKGROUND OF THE INVENTION

1. Field of the Invention

This invention relates generally to education of medical professionals using medical simulators, more specifically to a method and apparatus for integrating simulator data from multiple medical simulators.

2. Background Information

I. Medical Simulator Background

While it is desirable to train students in patient care protocols and proper use of specific medical devices before allowing contact with real patients, textbooks and flash cards lack the important benefit to students attained from "hands-on" practice. However, the training of medical personnel in the art of gynecological techniques or child-birthing, for example, is hampered by the unavailability of live patients willing to be practiced on and the undesirability of allowing untrained personnel from performing life affecting, and possibly threatening, medical procedures.

Thus, patient care education has, in recent years, often been taught using devices, such as a manikin configured to simulate a patient, commonly called "medical simulators", "patient simulators", and "patient mannequins", and "robotic patients" as well as simply "simulators" and "mannequins" (in context).

Within the meaning of this application the terms "medical simulators", "patient simulators", and "patient mannequins", and "robotic patients" as well as simply "simulators" and "mannequins" will reference a narrower subset of these devices that have at least one time based electronic signal as an output of the ongoing medical simulation. Typically, the electronic signal(s) from such simulators will be indicative of the simulated physiologic parameters of the "patient," during the training, such as the simulated heart rate, breath rate, body temperature, blood oxygenation, or any desired simulated physiologic parameter that is deemed useful for the procedure and for review of the procedure. These electronic signals can further include a video recording of the training session, an audio recording of the session, or ambient measurements, such as recording of ambient temperatures during the session. Again, within the meaning of this application a "simulator" must include at least one such electronic signal.

The presently available patient simulator mannequins provide "hands-on" training to medical personnel in areas such as trauma treatment, anesthesiology, gynecological examination, childbirth, and a host of other medical simulator specific procedures. These mannequins typically have significant physiologic mimicking capabilities. Various medical devices can be attached to these mannequins to train users in the proper implementation and use. These mannequins are typically computer controlled and are programmed for a variety of responses which simulate medical conditions.

Using patient simulator mannequins, the students, nurses, medical personnel, etc. can learn medical protocols and develop skills in manual dexterity and proper placement of leads, tubes, etc. without risk. One approach to the use of patient mannequins was taken in U.S. Pat. No. 5,853,292 which discloses using sensor-equipped "virtual" instruments interfaced with a patient simulator through a computer interface module. U.S. Pat. No. 6,535,714 relates to medical device training including providing for documentation of competency during the training exercise. This patent is incorporated herein by reference. U.S. Pat. No. 6,428,323 discloses a system for teaching students and health care professionals medical examinations performed manually inside a body cavity or anatomical space. This patent is incorporated herein by reference. U.S. Pat. No. 4,360,345, which is incorporated herein by reference, discloses a further simulator system for teaching cardiopulmonary resuscitation (CPR) and other basic physiological procedures.

As a further representative example, one gynecological medical simulator, known as ZOE™ brand product, is disclosed in U.S. Pat. No. 5,472,345. U.S. Pat. No. 7,465,168 owned by Birth Injury Prevention, LLC of Baltimore, Md. discloses a birthing simulator. Birthing is one physiological process that is useful to simulate. For instance, while the birthing process itself is a natural process that often concludes without complications, even in an uncomplicated birth, obstetric procedure can cause injury to the fetus and the mother. Moreover, while many births occur without complications, some births do not. Of the different types of complications that may occur, a number of them represent potentially life-threatening obstetric emergencies. Birthing simulators allow clinicians and researchers to research and train for complications and obstetric emergencies without risking fetal or maternal injury.

Gaumard Scientific Company, Inc. (Gaumard) of Miami, Fla. has developed a variety of medical simulators that are representative of the state of the art in medical simulators. Gaumard first introduced a basic childbirth simulator in 1949 and have over half a century of experience in the simulator field. The currently available NOELLE™ brand birthing simulator from Gaumard is a pregnant robotic simulator used in increasing numbers of medical schools and hospital maternity wards.

Further medical simulators and related devices described in U.S. Pat. Nos. 7,192,284; 7,114,954; 6,758,676; 6,527,558; 6,503,087; 6,503,087; 6,443,735; 6,193,519; 5,853,292 (discussed above); and U.S. Pat. No. 5,472,345 that are assigned to Gaumard. These patents are incorporated herein by reference.

Other examples of such patient mannequins are disclosed in U.S. Pat. Nos. 5,941,710; 5,900,923; 5,403,192; and 3,520,071, the disclosures of which are incorporated herein by reference.

The SIMMAN™ brand product is a portable and advanced patient simulator for team training in the emergency treatment of patients. The device is from Laerdal Medical, Inc. (Laerdal). The SIMMAN™ patient simulator has a realistic anatomy and clinical functionality and provides simulation-based education through realistic patient care scenarios. Laerdal further provides a PROMPT™ brand birthing simulator.

The Eagle Patient Simulator, developed by David Gaba, MD, and others, at Stanford University, and marketed by MedSim, Inc. of Ft. Lauderdale, Fla., connects to an interface cart that drives the mannequin's electromechanical functions. The cart also serves as the interface for conventional monitoring equipment found in the operating room.

The G. S. Beckwith Gilbert and Katharine S. Gilbert Medical Education Program in Medical Simulation is a resource for all Harvard Medical School students and faculty. The Gilbert Program integrated learning labs are each equipped with a realistic mannequin patient simulator, a seminar table with whiteboard, and a web-connected plasma display. This unified learning lab brings together traditional teaching and web-based information technology all at the bedside of a simulated patient. The mission of the G. S. Beckwith Gilbert and Katharine S. Gilbert Medical Education Program is to "bring to life" good teaching cases for medical students of all levels using high-fidelity patient simulation to foster experiential learning in a safe environment"

II. Recorded Medical Simulator Sessions

The realism of the patient simulators represents only one portion of the entire educational experience. It is common for the simulation events to be monitored and even recorded, typically on video-tape or via a hand held video recorder, for peer or teacher review. This critical review and feedback of a session is as important a teaching tool as the simulation itself.

In such analysis and feedback of given simulation sessions, the trainees can have mistakes pointed out and corrected. Conventionally this entails that the entire event is recorded on a camera for playback. The recording of the event is particularly useful in simulations where there are multiple participants, i.e. a "team" of participants, that may have overlapping spheres of influence, and the event recording is the only effective review of the team interaction to review how the team worked together. The simulator itself will often have a recording of the changes in all of the particular simulated physiologic parameters of the simulator (i.e. the data output) over the time of the session for latter analysis, whereby there is an objective review of the session on the simulator (e.g., how did the simulated patient do throughout the event).

The data output record of a session does not provide adequate information as to why a particular patient result was achieved in a session, particularly in a team participant environment with overlapping areas of influence relative to the simulated physiologic parameters of the simulator. A video and an audio recording of the event does add the ability to review why a particular result was or was not achieved in a session with the patient simulator.

In 2003, the Peter M. Winter Institute for Simulation, Education and Research (WISER), a simulation center located at the University of Pittsburgh Medical Center (UPMC), attempted to utilize the Laerdal SIMMAN™ Simulator to generate Extensible Markup Language (XML) performance logs of simulation sessions that could then be utilized to correlate with a digital primary video file. The digital video recording was stored on a central server with playback made available over the Internet via a standard web browser. The time stamp on the performance log was attempted to be utilized as an index mechanism for the primary video file. The system never proved to be effective in practice, however, and the attempted integration was not sufficient to be a meaningful tool for students. The proposed system did not offer independent control over various inputs.

KB Port, LLC. (KB Port) of Pittsburgh, Pa. currently provides a system for effectively synchronizing the video, audio recordings and data log files for analysis and for playback (feedback). The KB Port ETC™ brand system can take multiple video and audio input signals and effectively synchronize these with multiple data inputs of medical simulators for integrated playback. The 2008 version of the ETC™ product provides a seamless integration of video and audio and data inputs and it is this system that is particularly helpful in implementing the aspects of the present invention as described below. The operating aspects of the ETC™ product are described in U.S. Patent Publication No. 2008-0124694 which is incorporated herein by reference in its entirety. Within the meaning of this application, the ETC™ system is a type of synchronizing system, wherein a synchronizing system is a system that can receive a variety of independent time based inputs, including audio and visual inputs, for storage and provide for playback of the inputs in an integrated, synchronized manner.

III Multiple Medical Simulators

There are several areas in which multiple medical simulators are utilized and beneficial, or in which the ability to utilize multiple medical simulators would be beneficial. Currently child birthing simulations can occasionally utilize a separate infant simulator. It has been known to progress through a first part of the simulation with the pregnancy simulator then artificially pause the simulation while the infant simulator is brought on-line to continue the session with the infant simulator. This interruption will negate the seamless training aspects of the exercise making it less realistic and thus less practical from a training perspective.

Other areas where the efficient use of multiple simulators is beneficial is in triage scenarios Triage is broadly defines as the process of sorting people based on their need for immediate medical treatment as compared to their chance of benefiting from such care. Triage is done in emergency rooms particularly in large cities, and in all medical facilities following natural disasters, wars and civil unrest when limited medical resources must be allocated to maximize the number of survivors.

The US Department of Defense defines "triage" as follows: "The evaluation and classification of casualties for purposes of treatment and evacuation. It consists of the immediate sorting of patients according to type and seriousness of injury, and likelihood of survival, and the establishment of priority for treatment and evacuation to assure medical care of the greatest benefit to the largest number." Triage in this sense originated in World War I. Wounded soldiers were classified into one of three groups: those who could be expected to live without medical care; those who would likely die even with care; and those who could survive if they received care.

Triage scenarios in medical facilities thus represent a wide variety of areas, from emergency room simulations where multiple "patients" need not be tied to a common triggering event, to multiple victim accidents (such as traffic or large scale industrial), to natural disasters and terrorist attacks. The triage scenarios are sometimes called mass casualty simulations. As a representative example, the Asian Disaster Preparedness Center conducted a Mass Casualty Management Simulation Exercise in the Udonthani Province in June 2006 simulating a traffic accident with a bus and a truck.

The advantages of simulators in such mass casualties scenarios have been seen, but the costs of such manikins prevent wide scale adoption for many triage applications. For example, at the time of filing the priority parent application Rush University Medical Center and John H. Stroger Hospital of Cook County Illinois had proposed a simulated mass casualty incident, presumably for October 2009, which was to be representative of a blast from conventional explosives with 12 victims (6 months to 60 years of age). Participants were intended to be physicians and nurses, divided into five medical teams. Victims were to be represented by life sized mannequins, each sustaining a unique pattern of injuries. Various outcomes were to be programmed, from successful resuscitation to death, as follows:

2 to survive without intervention (delayed), 2 to die regardless of intervention (expectant), and the outcome of 8 depended on time sensitive intervention (immediate). The participants were intended to be responsible for division of labor, triage, and medical management. The exercise was expected to involve limited resources such as ventilators, blood and imaging capability. Medical team performance was to be observed and recorded. At the time of filing this application the applicant's had no further information on this proposed simulation.

In a related discussion, an April 2009 article in Prehospital Emergency Care by Dale Vincent, et al discusses the teaching of mass casualty triage skills using iterative multi-manikin simulations. See also Kobayashi L, Shapiro M J, Gutman D C, Jay G. "Multiple encounter simulation for high-acuity multi-patient environment training", Acad Emerg Med. 2007; 14:1141-8. These articles are incorporated herein by reference.

The manikin use in such multiple victim scenarios have provided a number of recorded session data streams which must be evaluated individually to determine the session result. This requires an overall coordination of the results to fully evaluate the session which can become impractical. Further, the costs of each manikin and its associated recording system will limit the broader application of this technique.

With regard to wider simulations, as an example of a large-scale drill was the use of 130 actor-patients in a mass casualty incident disaster exercise in New York City as discussed in Schenker J D, Goldstein S, Braun J, et al. Triage accuracy at a multiple casualty incident disaster drill: the Emergency Medical Service, Fire Department of New York City Experience. J Burn Care Res. 2006; 27:570-5.

There remains a need in the industry to provide an efficient system to integrate multiple medical simulator data and other relevant inputs in real time. There remains a need in the industry to provide an efficient system that can expand manikin use to large mass casualty applications, triage applications, and other multi-simulator applications. There is a further need to address the deficiencies of the prior art in a cost effective manner.

SUMMARY OF THE INVENTION

At least some of the above objects are achieved with a method for multiple medical simulator integration comprising the steps of providing multiple medical simulators and simultaneously receiving at least one electronic data source input from each medical simulator into a common digital memory buffer in a time stamped manner for at least a given training event. Each electronic data source input is a data record throughout the event of a simulated parameter of the training simulator or a physical parameter of the training simulator. The common memory buffer allows independent, simultaneous, synchronized, user controlled playback of the individual inputs received within the memory buffer in any number of user defined configurations.

The invention provides for a live, real time integration of the inputs from multiple medical simulators. This can also be referenced as "on the fly" integration.

The present invention is primarily disclosed for patient simulators, but is not limited thereto. The present invention has applications in all training simulations where integrated simulation data from plural simulators and relevant recording would be helpful, such as flight simulators. However, it is particularly useful in "team training" simulators such as patient simulators where team interaction is critical.

The present invention is also disclosed for use for integrating digital video and audio recordings with data inputs in the form of time stamped moderator commentary or notes, and is particularly helpful in scenarios where contemporaneous moderator commentary can be added in a manner transparent to the subjects, whereby the subjects remain virtually unaffected by the moderator actions. The adding of time stamped moderator commentary or notes to the recorded integrated record is also known as "flagging" within the meaning of this application. The flagging of the record can also be done subsequent to the session where the moderator, or other reviewer, can expand upon contemporaneously added flags, or he can add new flags, and/or edit other flags, as desired.

The phrase electronic data source input when associated with a patient training simulator references data outputs of the training simulator that is indicative of each simulated parameter or physical property throughout the duration of an event. The physical parameters of the training simulator can, in non-limiting examples, include an audio input which is an audio record of the training event, and/or a video input which is a video record of the training event, and/or ambient temperature during the training event, and/or other ambient measurements. In a patient simulator the simulated parameters will be indicative of each simulated physiologic parameter that is represented by the specific patient simulator (e.g. heart rate, breath rate, blood pressure, blood oxygenation, body temperature, pupil dilation, cervix dilation, extremity changes, etc).

The term event is intended reference a given training session, which may be on a given set of training simulators, by a given set of participants (or team). The term event can be used interchangeably herein with session or with training event. The participants, could in certain circumstances, be only a single individual without changing the operation of the present invention. Further the "team" may include one or more instructors or moderators that are working with one or more trainees, or the participants may be entirely of instructors to create a given session baseline for comparison.

The phrase "audio record of the training event" relative to at least one audio input will reference an audio recording of the event including the participants (and/or monitors) in or with the training environment. The audio record of the training event will typically pick up the sounds of the participants (assuming they speak loudly and clearly enough—which is often another review criterion in team training) and of the simulator, if any. The present invention contemplates more than one audio record of the training event. Further, other audio inputs other than the participants are possible, such as a real time audio commentary of possibly remote observers; however such a real time commentary would still be an audio record of the training event, with the event location including both the location of the participants and the simulator and the location of the monitors.

The present invention allows reviewer commentary or flags to be added to the combined memory, or log file, in a time sequenced manner contemporaneously with the event and after the event has been recorded. The flags may be edited later and are not limited to text, the flags could be in audio segments or even audio video segments (e.g. a moderator later inserts a time appropriate video commentary including a demonstration of a proper technique to better illustrate his comment). Consequently, the present invention allows subsequent moderators or reviewers (i.e. those NOT present at the training session) to add commentary or flags, generally via text inputs, into the integrated log file to create appropriately located comments therein for review. These latter comments could be in audio or even video formats if desired for incorporation into subsequent playback of a moderated or graded session. Note that such latter added audio commentary for the flags is not an "audio record of the training event" as it is not contemporaneous therewith. The video commentary added later is similarly not a video record of the training event. The flags, whether they include text, audio video or combinations thereof are considered data inputs within the meaning of this application.

Finally, each simulator may have audio files as outputs, such as a record of the breathing sounds emitted by the simulated throughout a session; however, these audio files are considered data inputs within this disclosure as they are indicative of each simulated physiologic parameter that is represented by the specific patient simulator.

The phrase "video record of the training event" relative to at least one video input will reference a video recording of the event including the participants (and/or monitors) in or with the training environment. The video record of the training event will typically show one view of the participants and/or simulators. The present invention contemplates more than one video record of the training event, whereby the video record can have distinct views that focus on different aspects of the event. For example on view may be an overhead view focusing on the simulators, a second view be a perspective view focusing on one side of the participants and a third view that is a perspective focusing on the participants from an opposed side. Alternatively there may be distinct views for distinct simulators.

The common log file creates an integrated log file of time stamped data from all of the video, audio and data inputs. From this integrated log file the users can simultaneously play back any, and all, of the inputs in a synchronized fashion. Each video input may be played back in its own, independently sizable and locatable window on a display, such as a laptop display. The data inputs from each simulator will also have a conventional visual playback format, and it is common for multiple data inputs to be illustrated together. For example, heart rate, blood pressure, breath rate, and blood oxygenation are typically shown numerically and graphically in one panel display for each simulator. The audio inputs can be played back independently depending upon the set up of the playback display (e.g. left and right and or front and back side audio may be different). Alternatively, all the selected audio inputs may be appropriately mixed in the simultaneous feedback. The log file will also provide a display of the flags added to the file during playback, which may be integrated with other data inputs from the simulator.

The independent selection of the inputs for feedback allows the playback to remove extraneous inputs during playback of a certain portion of the session. For example, the audio inputs can be turned off and the playback only utilize an audio data file of the patient simulators with only a video centered on the respective patient simulators during a portion of the session where it was critical that the team participants recognize and change their actions based upon such simulators outputs.

The feedback controls will include standard digital playback options, such as play, stop, fast forward, time indexing, reverse and the like. Consequently in a detailed review and analysis of an event it is expected that moderators will play back a selected portion concentrating on one aspect, such as the patient simulator outputs, and then review the same portion of the session concentrating on the a separate aspect such as the participant actions. This sequential review of the same time period will entail a play back of the common log file with one set of inputs selected for play back and then a review of the same time period with an alternative set of inputs selected. Alternatively, for the video portions, the "concentration" on a particular section may be made by merely resizing of the desired windows to add emphasis as desired.

The integrated common log file provides for exporting a recorded session to any standard format, such as AVI or the like, for ease of transfer to other playback devices. The playback of an AVI or other "formatted" exported log file will no longer contain the ability to selectively elect the inputs for playback, as it will play back with the screen selections selected when transferred. However, this allows for easy transfer of a recorded, flagged training session to non-system computers.

The present invention may be set up in a wireless network configuration in which audio and video sources that come into range of the central controller, or server, are automatically integrated into the combined log file at that point. The wireless network configuration for the present system provides for easy system portability and easy system set up and modification. Further the present invention provides for a subject or trainee transparent interview or session flagging feature through a hand held wireless remote control for a moderator. This allows for training to be largely unaffected by the addition of moderator flags.

The present invention provides an interactive, integrated log file of an event using a simulator and or other data input device. The integrated log file provides effective backup log file for the event. The integrated log file allows for significant screen control in the selective playback of the session. The integrated log file allows for downloading of the session in standard formatting for playback on other devices. The system allows for automatic user identification and incorporation of participant identification into the integrated log file.

These and other advantages will be clarified in the following description of the invention in association with the attached figures in which like reference numerals represent like elements throughout.

BRIEF DESCRIPTION OF THE DRAWINGS

Other objects and advantages appear in the following description and claims. The enclosed drawings illustrate some practical embodiments of the present invention, without intending to limit the scope of the invention or the included claims.

DETAILED DESCRIPTION OF THE PREFERRED EMBODIMENTS

Figure 1:
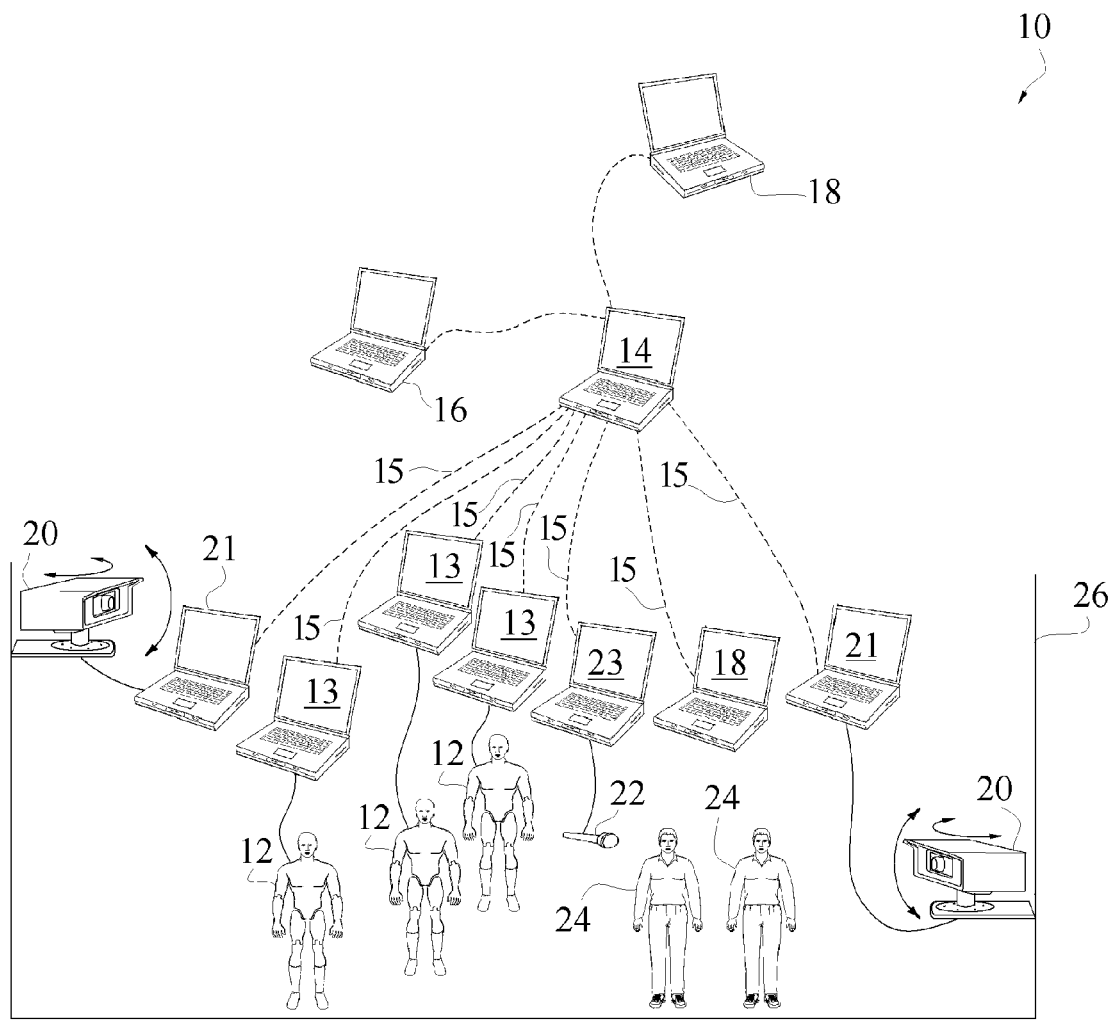
FIG. 1 is a schematic overview of the an apparatus for multiple medical simulator integration in accordance with one aspect of the present invention.
Figure 2:
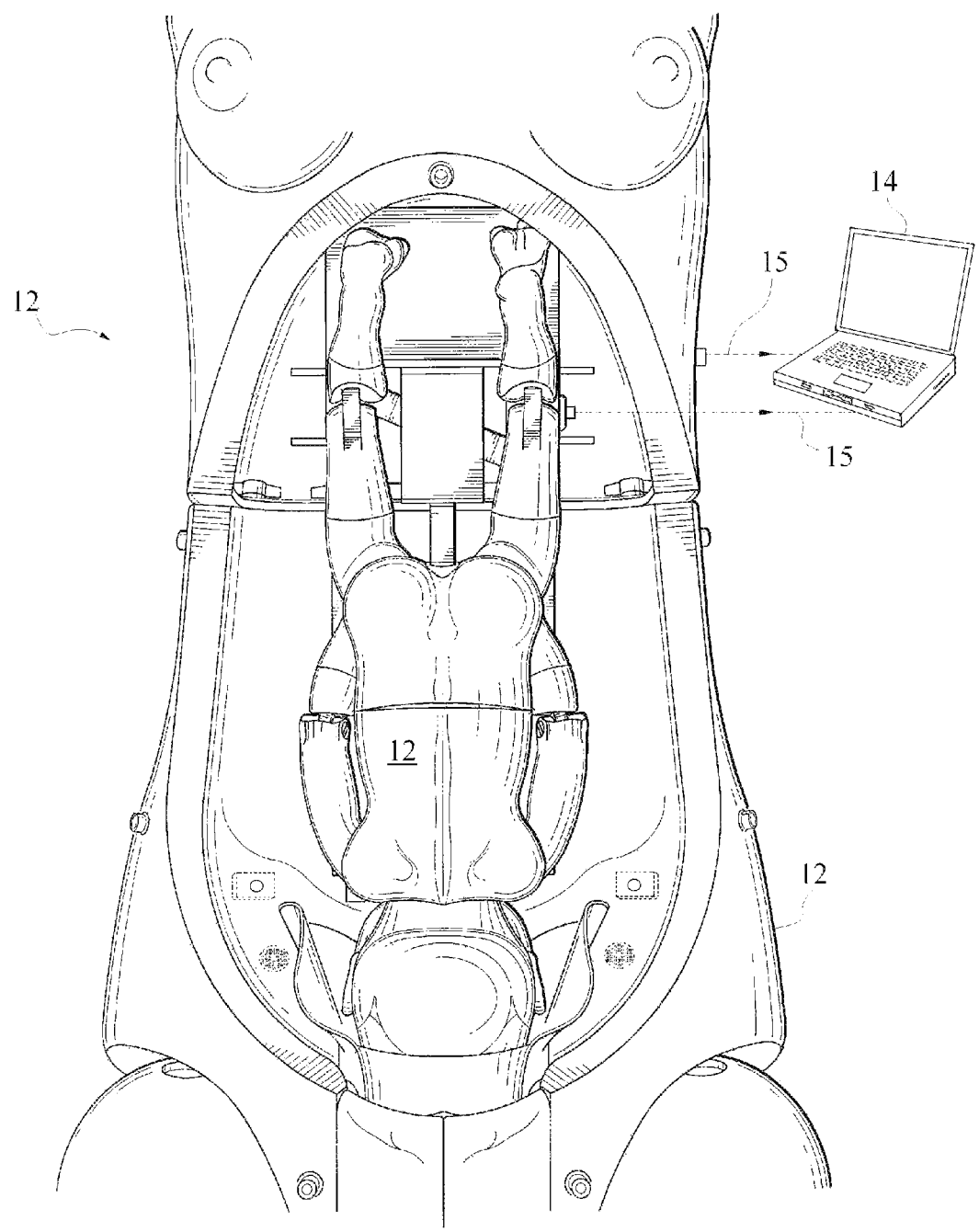
FIG. 2 is a schematic overview of the an apparatus for multiple medical simulator integration in accordance with one aspect of the present invention used for birthing simulations.

As will be described in greater detail below the present invention provides an apparatus 10 for the integrated recording and playback of video, audio and data inputs using multiple training simulators 12 is disclosed. The training simulators 12 may be patient simulators such as sold by Laerdal Medical (SimMan™ brand) or Medsim, or currently available NOELLE™ brand birthing simulator from Gaumard, as discussed above. These are representative examples rather than restrictive listings.

A controller 14 will receive data inputs from each of the simulators 12 through coupling 15, which may be a wireless connection. The data inputs are indicative of the physiologic parameters being simulated thereon, or are representative of physical parameters associated with the simulator 12. Further the controller 14 will identify the data from each simulator 12, such as through unique serial number transmitted with the data, a unique ID source associated with the data stream, or with a unique ID that is assigned by the controller 14 to each simulator data stream.

The controller 14 may be provided with its own display as noted in the figures, whereby the controller 14 is formed by a separate independent computer, such as a desktop, laptop or even tablet computer. The controller 14 may be formed as the KB Port ETC™ brand system that can take multiple video and audio input signals and effectively synchronize these with multiple data inputs of medical simulators for integrated playback. The 2008 version of the ETC™ product provides a seamless integration of video and audio and data inputs and it is this system that is particularly helpful in implementing the aspects of the present invention as described below. The operating aspects of the ETC™ product are also described in U.S. Patent Publication No. 2008-0124694 which is incorporated herein by reference. Within the meaning of this application, the ETC™ system is a type of synchronizing system, wherein a synchronizing system is a system that can receive a variety of independent time based inputs, including audio and visual inputs, for storage and provide for playback of the inputs in an integrated, synchronized manner.

The data inputs received by the controller 14 from the simulator 12 will typically be the same that simulators 12 currently maintain in the individual simulator session recordings for separate manikin controllers 13, however, as discussed below these inputs will be integrated into a common log file. Namely these data inputs correspond to data outputs of the training simulator 12 that are indicative of each simulated physiologic parameter that is represented by the specific patient simulator (e.g. heart rate, breath rate, blood pressure, blood oxygenation, body temperature, pupil dilation, extremity changes, etc). The simulator 12 may have a controller 13 with its own display for control of the simulator 12 and the controller 14 may be easily coupled to the controller 13 as shown in FIG. 1. The controller 13 may be a separate computer such as a desktop, laptop or tablet computer or the like. The controller 13 may alternatively be integrated into the manikin 12 to preserve the lifelike presentation of the manikin 12.

Figure 3:
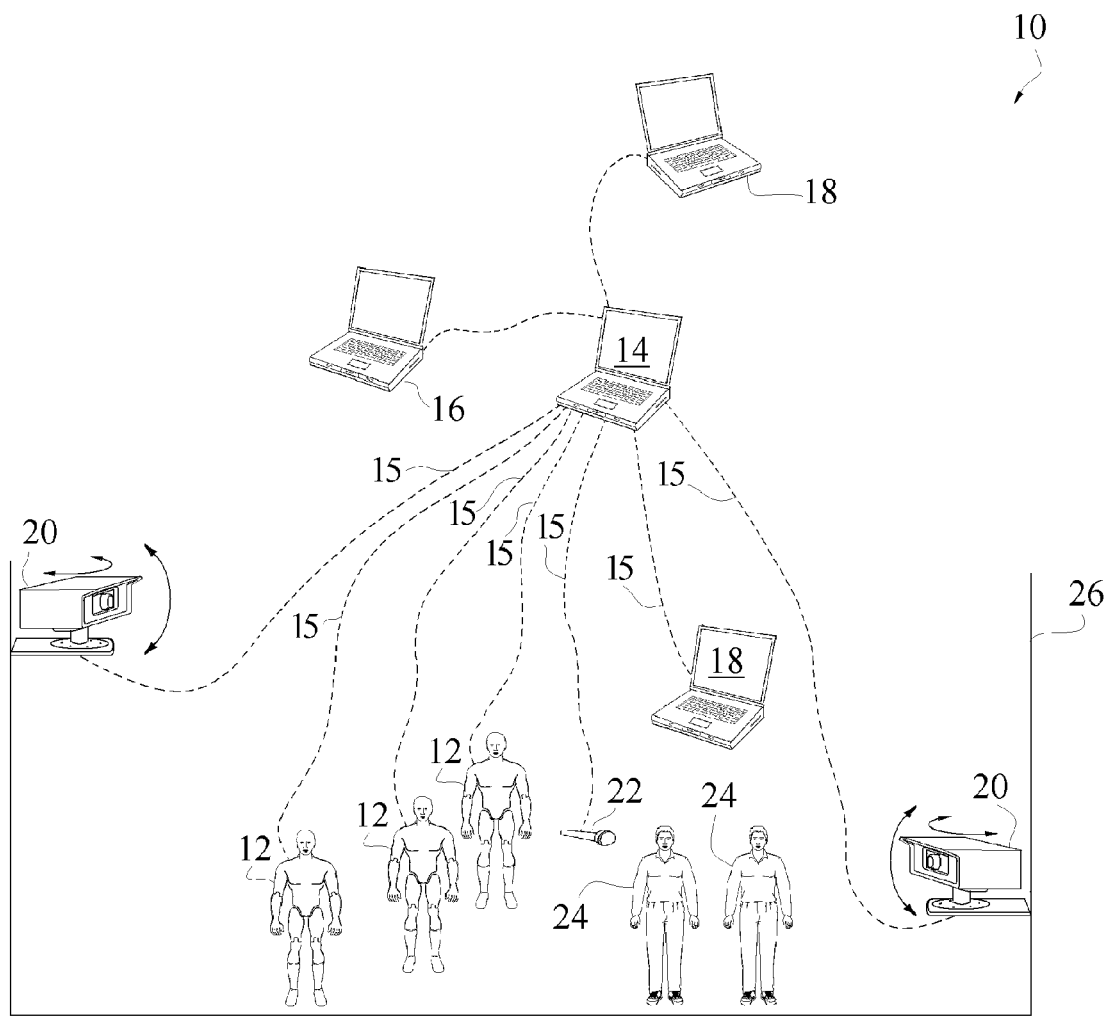
FIG. 3 is a schematic overview of the an apparatus for multiple medical simulator integration in accordance with one aspect of the present invention.

It is an important modification of the present invention that the manikins 12 may not have an independent controller 13, as shown schematically in FIG. 3. The particular data outputs may be directed to the controller 14. The manikins 12 may be coupled directly to the controller through a wireless coupling such as through a Wi-Fi coupling or BlueTooth coupling forming the connection 15 to allow the manikins greater freedom of movement.

The elimination of controller 13 for some or all simulators 12 can allow a very inexpensive collection of a large multiple manikins 12. Some or all of the multiple simulators 12 may, for example, comprise only a microphone and/or video camera that are associated with an otherwise non-electronic manikin, whereby the manikin and data output combine to form the manikin 12 according to the invention. In an alternative construction the microphone and/or video camera, or other data output such as a position sensor, can be associated with a specific human patient actor, whereby the human actor and the audio/visual data output combine to form the "medical simulator". This represents an extreme, but coupling a minimal number of data outputs with human actors and/or simple non-electric manikins can allow for cost effective mass number of medical simulators 12 under the present invention which can be very effective for large scale triage training (e.g. emergency preparedness).

In a further aspect of the present invention the data output for combining with a human actors and/or simple non-electric manikin can be formed on a coupling band, such as a wristband or belt, which is attachable to the human actors and/or simple non-electric manikins. One implementation of this concept is for the trainees (e.g. first responders) attach the data output devices to the selected manikins and or human actors to then form a medical simulator within the present invention. In addition to audio/visual outputs, the data output could include positional sensors (e.g. GPS) for tracking patient movement through an event. Any available sensor can be included in such an attachable data output, and generally this construction represents a significant reduction in the cost of a traditional medical simulator, and may be particularly useful for large mass casualty training events.

The apparatus 10 of the present invention will allow the recorded event to be played back on a standard computer 16 with associated display, and will allow the event to be played back on other devices, such as other networked computers 18, coupled to the controller 14. The computers 16 and 18 can also be used to add contemporaneous comment or flags to the log file during the session, which would be recorded as part of the total event history. The flags may be edited later via the computers 16 or 18. Consequently, the present invention allows subsequent moderators or reviewers to add commentary or flags, via computers 16 or 18, into the integrated log file to create appropriately located comments therein for review. These latter comments could be in audio or even video formats if desired for incorporation into subsequent playback of a moderated or graded session.

A plurality of video cameras 20 can provide video feeds of the event from different view points, and can, as noted above, form at least one of the data outputs of a particular manikin 12. The cameras 20 may be fixed in position or may be controlled to allow moderators to adjust the view as desired, typically through computers 16 and 18, with such control changes in camera view also being recorded in the log file. Each camera 20 is expected to carry a microphone for recording of a separate audio signal and is expected to have a unique identifier in the controller 14. The cameras 20 may be coupled directly to the controller 14 or through a separate video camera controller 21. The controller 21 may be a separate computer such as a portable laptop or tablet computer or the like. The video feeds may be through a frame grabber card on the controller 14 or 21, or more preferably and possibly more economically may be through a digital web cam device forming camera 20 coupled to the controllers 21 or 14 through a USB port connection. Other video sources may be used with analog to digital converters which then would generally be coupled to the controllers 21 or 14 through USB port connections. The cameras 20 and/or the controllers 21 will typically have a microphone such that these devices will also supply a separate audio input.

Independent microphones 22 may be employed as desired for obtaining separate audio signals that are not associated with a given camera view. The separate microphones may be coupled directly to the controller 14 or through a separate controller 23, which may be a separate computer such as a portable laptop or tablet computer or the like. The microphones 22, as noted above, may also form one of the data outputs of a particular manikin 12.

It is expected that the participants or trainees 24 in any session will be in a given location 26 having a plurality of mounted cameras 20 and microphones 22 relative to the intended position of the patient simulator 12. However the present invention is highly portable where WI-FI couplings or BlueTooth couplings are used for couplings 15 such that the event may be at a more realistic location (i.e. outdoors at a simulated crash scene).

Any number of manikins and added video, audio or extra data inputs may be used in the present invention. With a recorded session, e.g. the time stamped integrated log file of all data source inputs) sent to the hard drive, the hard drive allows independent, simultaneous, synchronized, user controlled playback of the individual inputs received within the memory buffer on computers 16 or 18. The users can simultaneously play back any, and all, of the inputs in a synchronized fashion. Each mannikin input may be played back in its own, independently sizable and locatable window on a display, such as a laptop display on computers 16 or 18 or even 14 (if provided with its own display). The data inputs will also have a conventional visual playback format, and it is common for multiple data inputs to be illustrated together. For example, heart rate, blood pressure, breath rate, and blood oxygenation are typically shown numerically and graphically in one panel display. The audio inputs can be played back independently depending upon the set up of the playback display (e.g. left and right and or front and back side audio may be different). Alternatively, all the selected audio inputs may be appropriately mixed in the simultaneous feedback. The playback options are effectively limitless and subject only to the needs of the user. The playback can be filtered to show any of what is desired and to filter out all other non-wanted aspects of the logfile. It is anticipated that each manikin will have a conventional playback default for showing all the associated inputs from the manikin 12.

As discussed above, the independent selection of the inputs for feedback allows the playback to remove extraneous inputs during playback of a certain portion of the session. For example, the audio inputs can be turned off and the playback only utilize an audio data file of one of the patient simulators 12 with only a video centered on that patient simulator 12 during a portion of the session where it was critical that the team participants recognize and change their actions based upon such simulator outputs.

The feedback controls will include standard digital playback options, such as play, stop, fast forward, time indexing, reverse and the like. Consequently in a detailed review and analysis of an event it is expected that moderators will play back a selected portion concentrating on one aspect, such as the patient simulator outputs, and then review the same portion of the session concentrating on the a separate aspect such as the participant actions. This sequential review of the same time period will entail a play back of the common log file with one set of inputs selected for play back and then a review of the same time period with an alternative set of inputs selected.

Alternatively, for the video portions, the "concentration" on a particular section may be made by merely resizing of the desired windows to add emphasis as desired. The present invention allows the subsequent moderators or reviewers to add commentary flags, generally via text inputs, into the integrated log file stored on the hard drive to create appropriately located comments therein for review. These latter comments could be in audio or even video formats if desired for incorporation into subsequent playback of a moderated or graded session.

The integrated common log file itself will generally have a color coded readable file, wherein the inputs of each device or separate input device can be easily identified in a visual inspection of the logfile inputs. The integrated common log file provides for exporting a recorded session to any standard format, such as AVI or the like, for ease of transfer to other playback devices. The playback of an AVI or other "formatted" exported log file will no longer contain the ability to selectively elect the inputs for playback, as it will play back with the screen selections selected when transferred.

Another feature of the wireless network configuration is that it is designed to have video and audio feeds synch up automatically to the log file when they become in range of the controller 14 during a session. It will be appreciated that the controller 14, manikins 12 and/or the separate audio/video and data sources may be mobile. For example, the scenario may follow simulated patients 12 from a remote scene on an ambulance into an emergency room then an operating room, with each stage of the process having its own set of feeds. With the wireless controller 14 formed as a laptop or other portable device it can easily move with the "patient" and pick up the various feeds as they come into range. Further, the cameras may be made mobile that can bring them into and out of range during a session. The auto-synch function allows for these variations to be accommodated without stopping the session and reconfiguring the system as each new source comes on line.

The present invention provides an interactive, integrated log file of an event using a plurality of medical simulators. The integrated log file provides effective backup log file for the event. The integrated log file allows for significant screen control in the selective playback of the session. The integrated log file allows for downloading of the session in standard formatting for playback on other devices. The present invention is disclosed for patient simulators, but is not limited thereto. The present invention is particularly useful in "team training" simulators such as patient simulators where team interaction is critical. It is also useful where transparent moderator commenting or flagging is desired.

There are many particular applications for the system 10. The wide variety of modifications and applications of the present invention will be apparent to those of ordinary skill in the art and these are included within the breadth and scope of the present invention. The scope of the present invention is defined by the appended claims and equivalents thereto.

What is claimed is:

1. A method for multiple medical simulator integration during a training event comprising the steps of:
   providing multiple medical simulators for a training event with each medical simulator generating at least one electronic data output throughout the event and an identification of the specific medical simulator; and
   simultaneously receiving each electronic data source output and each medical simulator identification from each medical simulator into a common digital memory buffer in a time stamped-manner for a given training event, wherein each electronic data source output is a data record throughout the event of a simulated parameter of the medical simulator or a physical parameter of the medical simulator,
   wherein at least one medical simulator includes a GPS position sensor.

2. The method for multiple medical simulator integration according to claim 1 wherein the common memory buffer allows independent, simultaneous, synchronized, user controlled playback of the individual data record throughout the event of a simulated parameter of specific medical simulators received within the memory buffer in a plurality of user defined configurations.

3. The method for multiple medical simulator integration according to claim 1 wherein at least one medical simulator is formed by a human patient actor having at least one data output.

4. The method for multiple medical simulator integration according to claim 3 wherein data output of the human patient actor includes a video output and an audio output.

5. The method for multiple medical simulator integration according to claim 1 wherein at least one medical simulator is a birthing simulator.

6. The method for multiple medical simulator integration according to claim 1 wherein at least one medical simulator is wirelessly coupled to the common digital memory buffer.

7. A method for triage training comprising the steps of:
providing multiple medical simulators for a triage training event with each medical simulator generating at least one electronic data output throughout the event and an identification of the specific medical simulator; and
simultaneously receiving each electronic data source output and each medical simulator identification from each medical simulator into a common digital memory buffer in a time stamped manner for at least a given triage training event, wherein each electronic data source output is a data record throughout the event of a simulated parameter of the medical simulator or a physical parameter of the medical simulator,
wherein at least one medical simulator includes a GPS position sensor.

8. The method of triage training according to claim 7 wherein the medical simulators are mobile and travel from a simulated accident site to the triage location during the simulated event.

9. The method of triage training according to claim 8 wherein the common memory buffer allows independent, simultaneous, synchronized, user controlled playback of the individual data record throughout the event of a simulated parameter of specific medical simulators received within the memory buffer in a plurality of user defined configurations.

10. The method of triage training according to claim 8 wherein at least one medical simulator is formed by a human patient actor having at least one data output.

11. The method of triage training according to claim 10 wherein data output of the human patient actor includes a video output and an audio output.

12. The method for multiple medical simulator integration according to claim 8 wherein at least one medical simulator is a birthing simulator.

13. The method for multiple medical simulator integration according to claim 8 wherein each medical simulator is wirelessly coupled to the common digital memory buffer.

14. A triage simulation system comprising:
multiple medical simulators for triage training events with each medical simulator generating at least one electronic data output throughout an event and an identification of the specific medical simulator; and
at least one common digital memory buffer configures to simultaneously receive each electronic data source output and each medical simulator identification from each medical simulator into the common digital memory buffer in a time stamped manner for at least a given training event, wherein each electronic data source output is a data record throughout the event of a simulated parameter of the medical simulator or a physical parameter of the medical simulator,
wherein at least one medical simulator includes a GPS position sensor.

15. The triage simulation system according to claim 14 wherein the common memory buffer allows independent, simultaneous, synchronized, user controlled playback of the individual data record throughout the event of a simulated parameter of specific medical simulators received within the memory buffer in a plurality of user defined configurations.

16. The triage simulation system according to claim 15 wherein the common memory buffer can be flagged contemporaneously with the training event and after the training event.

17. The triage simulation system according to claim 16 wherein at least one medical simulator is a birthing simulator.

* * * * *